(12) United States Patent
Steinbichler

(10) Patent No.: US 8,168,111 B2
(45) Date of Patent: May 1, 2012

(54) INJECTION MOULDING METHOD

(75) Inventor: Georg Steinbichler, Rottenmann (AT)

(73) Assignee: Engel Austria GmbH, Schwertberg (AT)

( * ) Notice: Subject to any disclaimer, the term of this patent is extended or adjusted under 35 U.S.C. 154(b) by 1398 days.

(21) Appl. No.: 11/288,540

(22) Filed: Nov. 29, 2005

(65) Prior Publication Data

US 2006/0119008 A1    Jun. 8, 2006

(30) Foreign Application Priority Data

Dec. 2, 2004  (AT) ................. A 2024/2004

(51) Int. Cl.
*B29C 45/00* (2006.01)
(52) U.S. Cl. ................. 264/328.19; 264/328.1
(58) Field of Classification Search ............... 264/328.1, 264/328.4, 328.19
See application file for complete search history.

(56) References Cited

U.S. PATENT DOCUMENTS 6,254,813 B1 * 7/2001 Eckardt et al. .................. 264/39
6,680,012 B2 * 1/2004 Pokorny ....................... 264/40.4

FOREIGN PATENT DOCUMENTS

JP           04325216       11/1992
WO        WO 01/03906     1/2001

* cited by examiner

*Primary Examiner* — Monica A Huson
(74) *Attorney, Agent, or Firm* — Notaro, Michalos & Zaccaria P.C.

(57) ABSTRACT

An injection molding method in which plastic material under pressure is injected from a storage chamber with a closable outlet into a mold cavity and fills same under pressure, wherein the volume of the storage chamber and the pressure obtaining therein upon opening of the closure means are of values which are sufficient for filling of the mold cavity by expansion of the material in the storage chamber, and the storage chamber is arranged in the mold forming the mold cavity.

5 Claims, 3 Drawing Sheets

INJECTION MOULDING METHOD

The invention relates to an injection moulding method in which plastic material under pressure is injected from a storage chamber with a closable outlet into a mould cavity and fills same under pressure, wherein the volume of the storage chamber and the pressure obtaining therein upon opening of the closure means are of values which are sufficient for filling of the mould cavity by expansion of the material in the storage chamber.

A method of that kind is described in WO 01/03906. The apparatus shown in FIG. 1 serves for carrying out the known method. In that apparatus no difficulty is involved in using the screw pre-chamber as the storage chamber which is essential for the expansion injection moulding procedure. More specifically, the connecting region between the screw pre-chamber and the mould cavity does not have any considerable flow resistance here.

In comparison the invention is based on a typical situation of use in which a plurality of mould cavities are arranged in a mould. That means that a correspondingly branched hot runner system is necessary. It has been found that the flow resistance of that system considerably impedes expansion of the plastic material from the screw pre-chamber into the mould cavity or cavities. According to the invention that disadvantage is avoided in that the storage chamber is arranged in the mould forming the mould cavity.

Even if the invention is advantageous in particular when a plurality of mould cavities are arranged in a mould, it does not involve any limitation to that situation. More specifically even when using a single mould cavity the invention affords the advantage of minimal flow resistance between the storage chamber and the mould cavity. In addition the storage chamber involves identical conditions of pressure and volume in each cycle, whereas the volume of the screw pre-chamber can be reduced by virtue of the stepwise feed of plastic material into the storage chamber, without that having a measurable influence on the operating procedure. That applies when, and this is also the main situation of use of the invention, the runner system between the screw pre-chamber and the storage chamber forms a throttle which is more effective by a multiple than the flow resistance caused by the opened closure means of the storage chamber.

Further details of the invention are described hereinafter with reference to the drawing in which.

Figure 1:
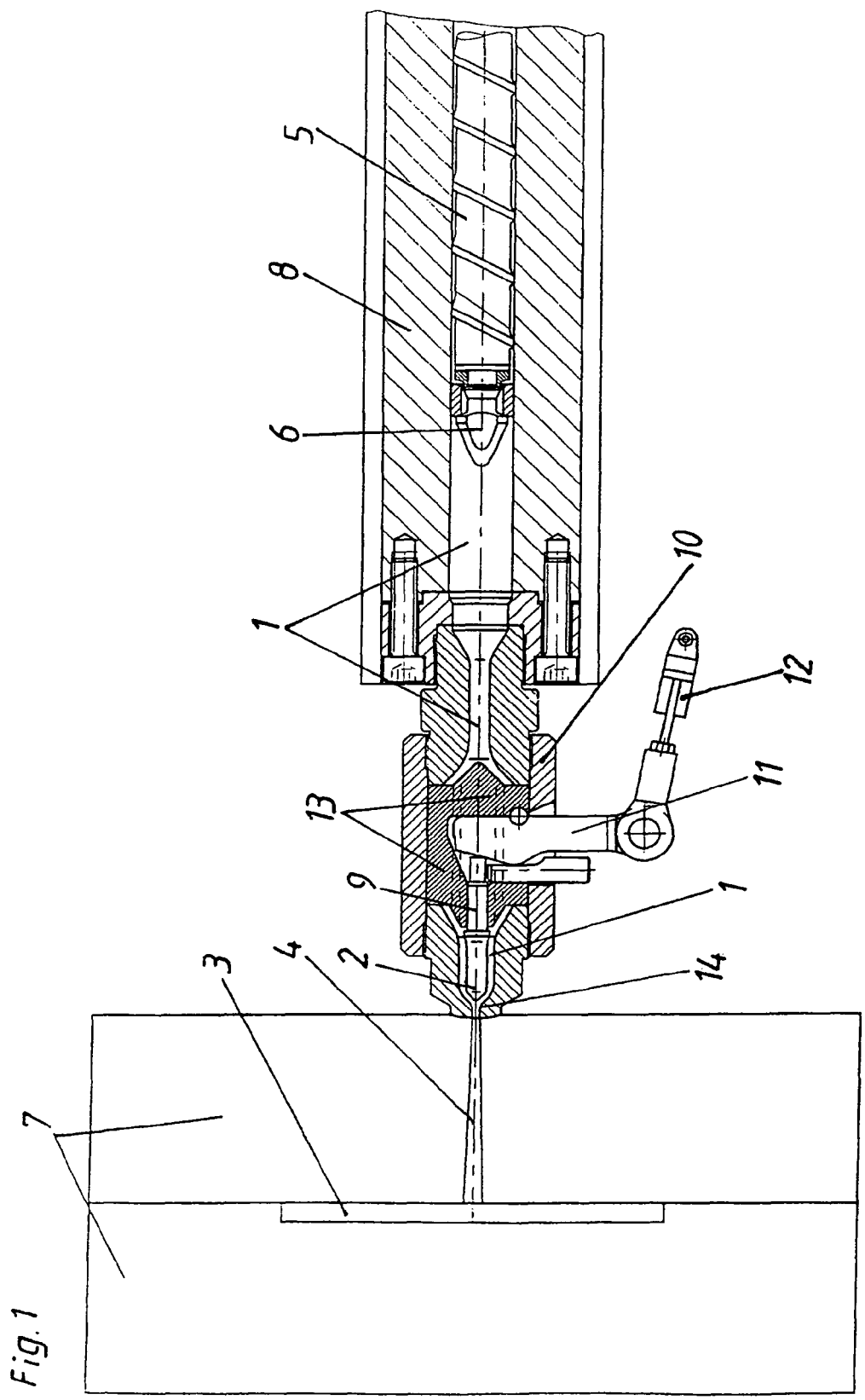
FIG. 1 shows the state of the art.

The known method can be carried out on any conventional injection moulding apparatus insofar as the feed flow to the mould cavity is controllable by a closure means. Therefore only the parts of an injection moulding apparatus, which are essential to the method, are described and illustrated in FIG. 1.

In the illustrated apparatus thermoplastic material is plasticised in the cylinder 8 by a screw 5 and in that procedure passes into the pre-chamber 1. That extends through the bores 13 almost as far as the mould 7. Its front opening 14 is closable towards the mould 7 by a closure means 2 whereas a reverse flow of the plastic material out of the pre-chamber 1 is prevented by a reverse flow blocking means 6 at the tip of the screw 5.

An essential functional part of the closure means 2 is in per se known manner a closure needle 9 which, under the pressure of the plastic material in the pre-chamber 1, has a tendency to move towards the right in the drawing. The needle 9 is acted upon in the closure direction by a lever 11 which is pivotable about the pin 10 and which is subjected to the action of a controllable hydraulic unit 12.

It is essential for expansion injection moulding that a substantially higher pressure is built up in the plastic material in front of the closure means 2, than is otherwise usual, and that filling of the mould cavity 3 and the feedhead region 4 upstream of same is effected by expansion of the plastic material in the pre-chamber 1. Opening of the closure means 2 can be effected in controlled fashion in order to modify the variation in pressure in the mould cavity 3 which is determined primarily by adiabatic relief of the plastic material in the pre-chamber 1.

In order to be able to suitably determine the pressure and volume in the pre-chamber 1 for a given mould cavity 3, desirably a volume is firstly selected for the pre-chamber 1, which substantially exceeds the volume of the mould cavity 3. Then the desired pressure in the mould cavity 3 is selected. The pressure in the pre-chamber 1 which leads to that result can be ascertained in a simple series of tests. When the state equation of the plastic material used is known it is also readily possible to calculate that pressure. That is then set forth by means of an embodiment.

EXAMPLE

Material used: polystyrene 143 E
Density at room temperature: 1.047 g/cm$^3$
Volume of the pre-chamber 1 upstream of the closure means 2: 45.6 cm$^3$
Volume downstream of the closure means 2: 1.37 cm$^3$, of which 1 cm$^3$ actual mould cavity 3.

The plastic material is under a pressure of 2000 bars, due to compression its temperature rises by 30° above the desired working temperature of 220° C.

The closure means 2 is now opened, whereby the plastic material expands to the total available volume, that is to say into the region 4 of the feedhead and into the mould cavity 3. That adiabatic expansion involves cooling by 30° C. and a drop in pressure to the desired final range of 500 bars. That pressure is sufficient for production of the desired product.

Figure 2:
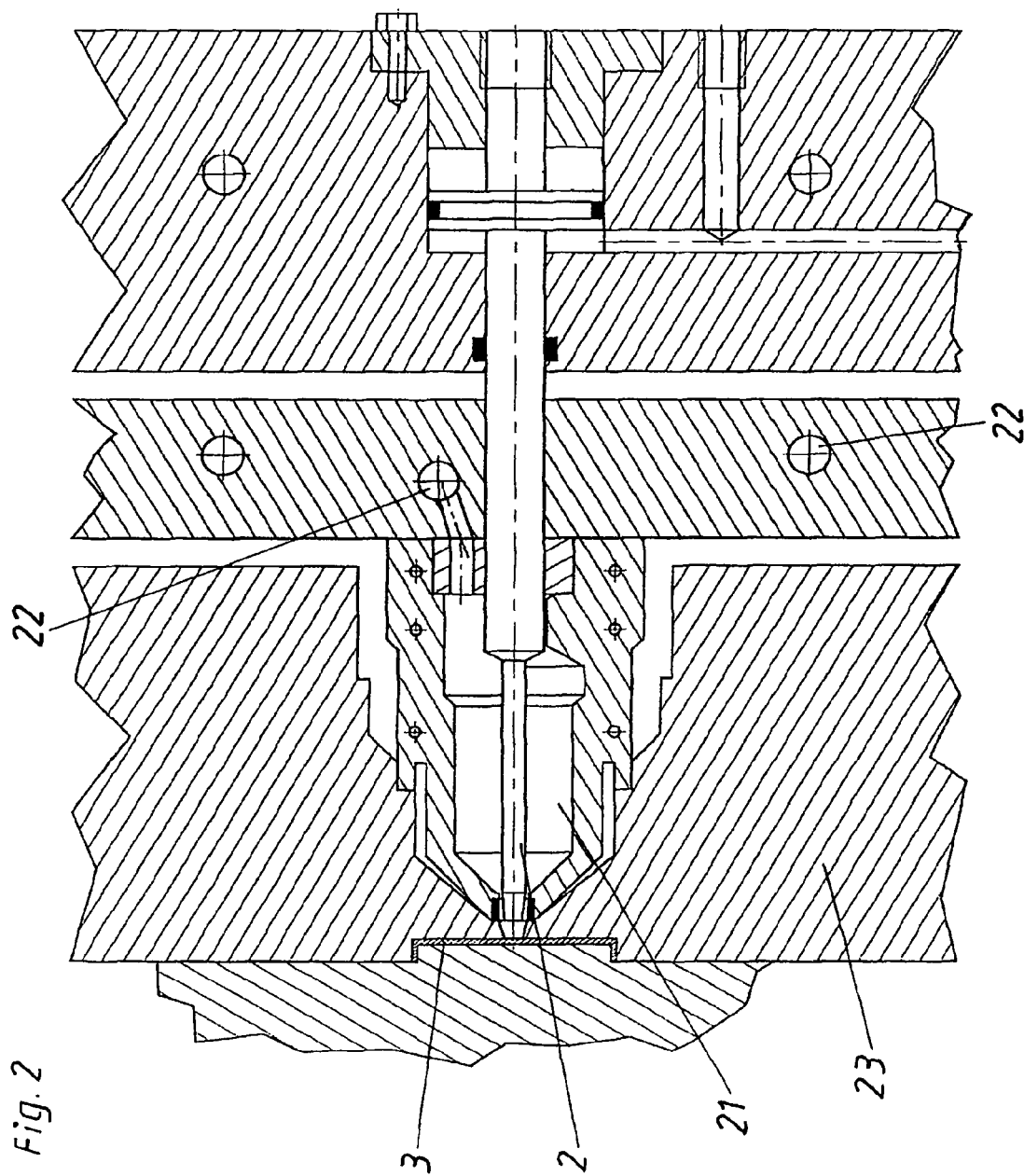
FIG. 2 shows a cross-section through a mould tool designed in accordance with the invention.

The invention differs from the state of the art shown in FIG. 1 in that the screw pre-chamber 1 no longer forms the storage chamber, but a storage chamber 21 is provided in the wall 23 of the mould 7, as can be seen from FIG. 2. The storage chamber 21 is provided in per se known manner with a closure means 2 which provides a direct communication with the mould cavity 3. Such an arrangement of a needle closure means directly at the entry of a mould cavity 3 is known, and the arrangement of a storage chamber in the mould wall is also known per se from AT 408 087 B. What is novel however is implementing transport of the plastic material from the storage chamber 21 into the mould cavity 3 substantially by expansion of the material in the storage chamber 21. As the pressure which can be achieved in the storage chamber 21 generally cannot be substantially above 3000 bars the volume of the storage chamber 21 must be selected at a sufficiently great value that sufficient plastic material passes into the mould cavity 3 due to adiabatic expansion of the material filling the storage chamber.

If the underlying method of the invention is characterised in that transport of the plastic material is effected substantially by expansion, that means in particular that the course of the method is not to be determined by the controlled movement of a piston or the like. Besides the expansion of the plastic material, contraction, which is involved with the drop in pressure, of the initially elastically stretched steel parts, necessarily has an influence which can certainly be about 20% involved in the calculation.

It is not necessary for all the material filling the storage chamber to be plastic material. In order to reduce the residence time of the plastic material in the storage chamber 21 it is rather possible to provide in the storage chamber 21 a sub-chamber which is separated off by a diaphragm or the like and which is in a condition of pressure equilibrium with the plastic material and which is filled with hydraulic fluid or another elastic medium.

Figure 3:
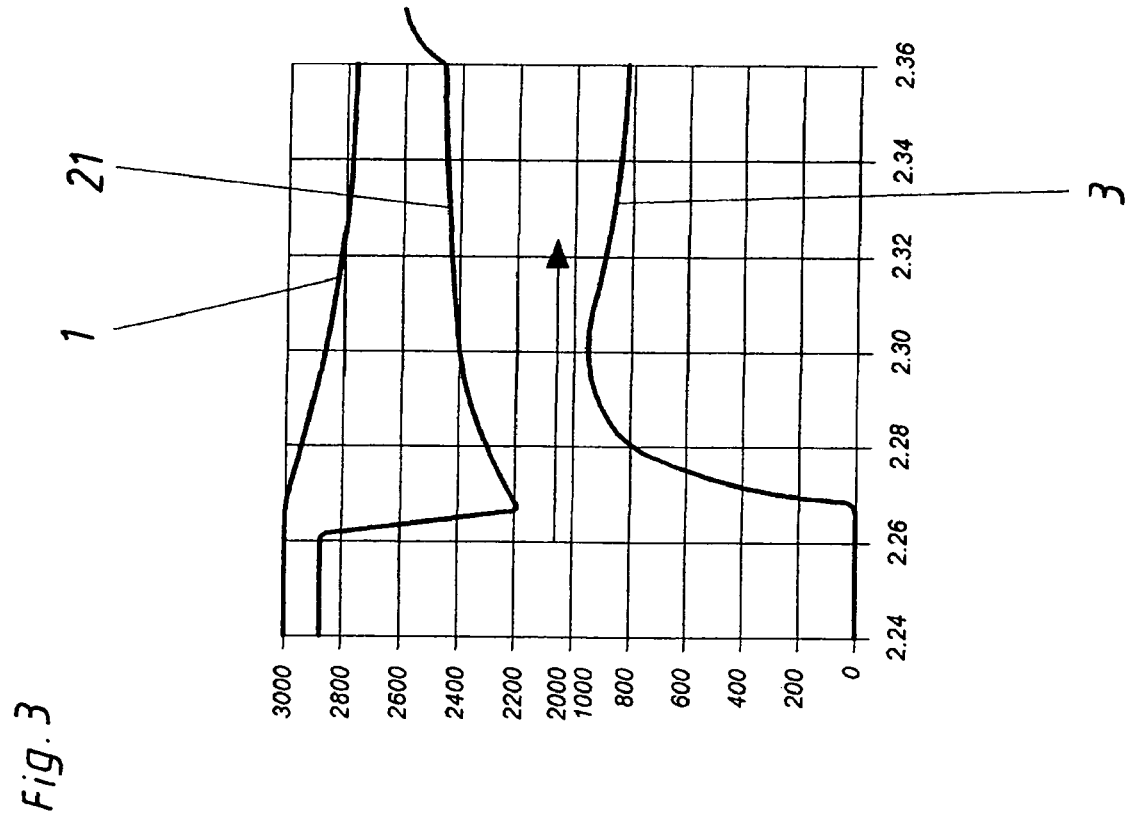
FIG. 3 shows the measured variation in pressure when using a tool as shown in FIG. 2.

It can be seen from FIG. 3 that a hot runner system 22 of a length for example of 160 mm substantially decouples the processes in the cavity 3 from the condition in the screw pre-chamber 1 so that the only function of the screw pre-chamber 1 is to provide a make-up delivery of the material necessary for filling the mould cavity 3 and to put it under the necessary pre-stressing and optionally to produce the post-pressure which is less significant when a short cycle time and thin mouldings are involved.

The pressure in the screw pre-chamber 1 and in the storage chamber 21 respectively in relation to time is illustrated in the upper region of FIG. 3. The time scale relates to seconds after the beginning of compression of the plastic material in the screw pre-chamber 1 which raises the pressure obtaining there to about 3000 bars. The lower part of FIG. 3 relates to the pressure in the mould cavity 3.

In the illustrated example the closure means 2 is opened at the moment 2.26 as soon as the pressure in the storage chamber 21 has substantially become equal to that in the screw pre-chamber. As will be seen the plastic material in the mould cavity 3 reaches the pressure sensor within a hundredth of a second and reaches its definitive value within a further hundredth of a second. That is to be attributed as good as exclusively to the pressure drop in the storage chamber 21 which is only gradually compensated by the feed of plastic material from the screw pre-chamber 1. In the specific case the illustrated procedure was used to produce a battery casing for a mobile telephone, which was only 0.17 mm thick, and that with a flow path length of 30 mm. Such a flow path-wall thickness ratio of 200:1 cannot be achieved with any known method, in the present case however that is achieved even with a cycle time of less than 5 seconds.

In this test the minimum volume in the screw pre-chamber 1 was 15 cm$^3$, the constant volume of the storage chamber 21 was 9.3 cm$^3$ and the volume of the mould cavity was 0.7 cm$^3$.

The pressure in the storage chamber does not necessarily have to be produced by means of the metering screw. If however that is the case, an electrical drive for the metering screw is desirable as the position of the screw can in that case be more accurately defined. In order to make the storage chamber independent of the screw pre-chamber, it is also possible to provide a closure means which could also be electrically controlled, in addition to the storage chamber closure means shown in FIG. 2, for the screw pre-chamber, as illustrated in FIG. 1. Accordingly the structure of the apparatus but not the mode of operation corresponds substantially to AT 408 087 B.

The invention claimed is:

1. An injection molding method comprising: injecting plastic material under pressure from a storage chamber with a closable outlet that is closable by closure means, into a mold cavity formed by a mold, for filling the mold cavity under pressure, wherein the volume of the storage chamber and the pressure therein upon opening of the closure means are selected to have values which are sufficient for filling of the mold cavity substantially only by expansion of the material in the storage chamber, and wherein the storage chamber is arranged in the mold forming the mold cavity.

2. The method according to claim 1, including providing the volume of the storage chamber to be at least five times as great as the volume of the mold cavity.

3. The method according to claim 2, wherein a flow resistance in a connecting region of the storage chamber and the mold cavity is provided to be substantially less than that in hot runners upstream of the storage chamber.

4. The method according to claim 3, wherein a length of the hot runners leading to the storage chamber is provided to be at least ten times as great as the spacing of the storage chamber from the mold cavity forming a finished molding.

5. The method according to claim 1, including providing a plurality of mold cavities with which a plurality of storage chambers are associated, and wherein the closure means of the storage chambers are provided to be needle closure means, have a common actuating device.

* * * * *